(12) United States Patent
Hottinen et al.

(10) Patent No.: US 8,208,439 B2
(45) Date of Patent: Jun. 26, 2012

(54) OPTIMAL USER PAIRING FOR MULTIUSER MIMO

(75) Inventors: Ari Tapani Hottinen, Espoo (FI); Emanuele Viterbo, Turin (IT)

(73) Assignee: Nokia Corporation, Espoo (FI)

( * ) Notice: Subject to any disclaimer, the term of this patent is extended or adjusted under 35 U.S.C. 154(b) by 669 days.

(21) Appl. No.: 12/344,380

(22) Filed: Dec. 26, 2008

(65) Prior Publication Data

US 2009/0296648 A1 Dec. 3, 2009

Related U.S. Application Data

(60) Provisional application No. 61/009,350, filed on Dec. 28, 2007.

(51) Int. Cl.
*H04W 4/00* (2009.01)
(52) U.S. Cl. ........................................ 370/330
(58) Field of Classification Search .................. 370/204, 370/342, 345, 330; 455/561
See application file for complete search history.

(56) References Cited

U.S. PATENT DOCUMENTS

2006/0121946 A1* 6/2006 Walton et al. .................. 455/561
2006/0285606 A1 12/2006 Khojastepour et al. ....... 375/267

OTHER PUBLICATIONS

International Search Report and Written Opinion, received in correspnding PCT Application No. PCT/IB2008/003631, issued by European Patent Office (ISA), Aug. 4, 2009, 14 pages.
Ajib, Wessam, "An Overview of Scheduling Algorithms in MIMO-Based Fourth Generation Wireless Systems", IEEE Network, Sep./Oct. 2005, pp. 43-48.
Aktas, Defne, et al., "Multiuser Scheduling for MIMO Wireless Systems", Vehicular Technology Conference, Oct. 6-9, 2003, pp. 1743-1747.
Bendemer, Bernd, et al., "Capacity-Based Uplink Scheduling Using Long-Term Channel Knowledge", IEEE International Conference on Communications, Jun. 1, 2007, pp. 785-790.
Hottinen, Ari, et al., "Optimal User Pairing in Downlink MU-MIMO with Transmit Precoding", Modeling and Optimization in Mobile, Ad Hoc, and Wireless Networks and Workshops, Apr. 1, 2008, pp. 97-33.
Viterbo, Emanuele, "Optimal User Pairing for Multiuser MIMO", Spread Specturm Techniques and Applications, Aug. 25, 2008, pp. 242-246.
Zhang, Ruifeng, "Scheduling for Maximum Capacity in SDAM/TDMA Networks", IEEE International Conference on Acoustics, Speech, and Signal Processing, 2002, pp. III-2141-III-2144.
3rd Generation Partnership Project, "UL Virtual MIMO System Level Performance Evaluation for E-UTRA", 3GPP Draft, Nov. 1, 2005, 5 pages.
Chan, et al., "Performance Comparison of Downlink Multiuser MIMO-OFDMA and MIMO-MC-CDMA with Transmit Side Information-Multi-Cell Analysis", IEEE Transactions on Wireless Communications, vol. 6, No. 6, (Jun. 2007), (pp. 2193-2203). R.W. Heath Jr., M. Airy, and A.J. Paulraj, "Multiuser diversity for MIMO wireless systems with linear receivers" Conference Record of the Thirty Fifth Asilomar Conference on Signals, Systems and Computers, Nov. 4-7, 2001, vol. 2, pp. (pp. 1194-1199).
H.W. Kuhn, "The Hungarian Method for the assignment problem," Naval Research Logistic Quarterly, 2:83 97,(1955), (pp. 83-97).
C. Wang, R. Murch, "Adaptive Downlink Multi-User MIMO Wireless Systems for Correlated Channels with Imperfect CSI", III Transactions on Wireless Communications, vol. 5, No. 9, (Sep. 2006), (pp. 2455-2446).

* cited by examiner

*Primary Examiner* — Gary Mui
*Assistant Examiner* — Richard K Chang
(74) *Attorney, Agent, or Firm* — Harrington & Smith (57) ABSTRACT

A method includes operating a receiver connected with $n_r$ receive antennas to receive uplink signals from K users having $n_t$ transmit antennas each; and scheduling which users are to transmit in a same time-frequency-code slot. A particular user pairing configuration is denoted by $\pi$ within a set of all configurations $\Pi$, and scheduling includes expressing mutual information as an additive objective function and maximizing the additive objective function over a particular choice of $\pi \in \Pi$.

17 Claims, 3 Drawing Sheets

OPTIMAL USER PAIRING FOR MULTIUSER MIMO

RELATED APPLICATION

This patent application claims priority to U.S. Provisional Application No. 61/009,350, filed Dec. 28, 2007, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques for transmitting multiple-input, multiple-output radio frequency signals to a receiver.

BACKGROUND

Various abbreviations that appear in the specification and/or in the drawing figures are defined as follows:

| | |
|---|---|
| BS | base station |
| CDMA | code division multiple access |
| DL | downlink (BS to MS) |
| EUTRAN | evolved universal terrestrial radio access network |
| FDMA | frequency division multiple access |
| LTE | long term evolution |
| MIMO | multiple-input, multiple-output |
| MF | matched filter |
| ML | maximum likelihood |
| MMSE | minimum mean squared error |
| MS | mobile station |
| MU | multiuser |
| SDMA | spatial division multiple access |
| SNR | signal to noise ratio |
| TDMA | time division multiple access |
| UL | uplink (MS to BS) |
| WiMAX | worldwide interoperability for microwave access (IEEE 802.16) |

MIMO takes advantage of multiplexing to increase wireless bandwidth and range. MIMO algorithms send information out over two or more antennas and the information is received via multiple antennas. While in a conventional sense such multiplexing would cause interference, MIMO uses the additional pathways to transmit more information and then recombines the signal at the receiver. A MIMO system provides a significant capacity gain over conventional single antenna systems, in addition to more reliable communication.

Various publications that may be of interest herein include:

W. Ajib and D. Hoccoun, "An overview of scheduling algorithms in MIMO-based fourth-generation wireless systems," IEEE Network, September/October 2005, incorporated by reference;

R. W. Heath Jr., M. Airy, and A. J. Paulraj, "Multiuser diversity for MIMO wireless systems with linear receivers" Conference Record of the Thirty-Fifth Asilomar Conference on Signals, Systems and Computers, 4-7 Nov. 2001, Vol. 2, pp. 1194-1199, incorporated by reference;

B. Bandemer, S. Visuri, "Capacity-Based Uplink Scheduling Using Long-Term Channel Knowledge," ICC '07. IEEE International Conference on Communications, 24-28 Jun. 2007, pp. 785-790, incorporated by reference;

H. W. Kuhn, "The Hungarian Method for the assignment problem," Naval Research Logistic Quarterly, 2:83-97, 1955, incorporated by reference; and C. Wang, R. Murch, "Adaptive Downlink Multi-User MIMO Wireless Systems for Correlated Channels with Imperfect CSI", III Transactions on Wireless Communications, Vol. 5, No. 9, pp. 2455-2446, September 2006, also incorporated by reference.

In general, a MU-MIMO system is characterized by K users with $n_t$ antennas each communicating to a base station or to another multiuser receiver with $n_r$ receive antennas. Since each user faces a different channel condition, in different time/frequency/code (TFC) slots it is possible to improve the overall system capacity by MU scheduling. This technique attempts to increase the system capacity by intelligently allocating the channel to different subgroups of users. A general introduction to this topic can be found in W. Ajib and D. Hoccoun, "An overview of scheduling algorithms in MIMO-based fourth-generation wireless systems," IEEE Network, September/October 2005. Among the most popular MU scheduling schemes are opportunistic scheduling and best subset selection. All scheduling schemes are confronted with a fairness issue that may force the sacrifice of overall network optimality in order to guarantee all users with a minimum service requirement.

SUMMARY

The foregoing and other problems are overcome, and other advantages are realized, by the exemplary embodiments of this invention.

In one exemplary aspect thereof the embodiments of this invention provide a method that includes operating a receiver connected with $n_r$ receive antennas to receive uplink signals from K users having $n_t$ transmit antennas each; and scheduling which users are to transmit in a same time-frequency-code slot. A particular user pairing configuration is denoted by $\pi$ within a set of all configurations $\Pi$, and scheduling includes expressing mutual information as an additive objective function and maximizing the additive objective function over a particular choice of $\pi \in \Pi$.

BRIEF DESCRIPTION OF THE DRAWINGS

In the attached Drawing Figures:

FIGS. 2 and 3 graphs that plot capacity versus a number of users, and show the significant improvement that can be achieved using optimal pairing of users in accordance with the embodiments of this invention, where FIG. 2 depicts a case of only paired users at SNR=16, and FIG. 3 depicts a case of both paired and single users at SNR=13.

DETAILED DESCRIPTION

The exemplary embodiments of this invention relate to wireless systems that include user scheduling and MU signal detection. In particular, exemplary embodiments of this invention relate to "virtual MIMO" schemes supported by, for example, the IEEE 802.16e specification (referred to as collaborative MIMO) and to the UL of 3GPP UMTS LTE (EUTRAN).

The exemplary embodiments of this invention provide scheduling patterns (particular ways of pairing users) that are network optimal in that they maximize total capacity with a certain fairness criteria. In particular, exemplary embodiments provide an optimal polynomial-time algorithm for determining scheduling patterns for K users. The scheduling patterns dictate which users are paired to transmit simultaneously (virtual MIMO), and which users are transmitting alone, in a given set of channel resources (TFC slots).

Conventional approaches typically deal with a case where only pairing is allowed (and not also single users), and fail to describe an efficient algorithm for computing the pairing. In many cases only an enumeration of all possible solutions is provided which can result in needing to examine over $2 \times 10^6$ potential pairings with 16 users, and about $1.9 \times 10^{17}$ potential pairings with 32 users, which clearly is impractical.

The exemplary embodiments provide both a novel scheduling algorithm and sets of scheduling patterns (user pairings over multiple channel resources) provided by the algorithm. An exemplary embodiment of the algorithm, described in detail below, allocates in a K user system, in one scheduling interval, users to K channel resources (time-frequency slots) so that in each slot there are one or two users, and such that each of the K users transmits in at least one slot of the K available slots. Moreover, the exemplary embodiment of the algorithm is capable of providing a scheduling pattern in the K slots where at least one user is scheduled to two slots, and is paired with a different other user in each of the two slots.

The exemplary embodiments of this invention may be implemented in a BS or access point, or where ever a MU scheduling unit is located. Signaling of resources (at least for some scheduling patterns) to the users is assumed to be supported, such as in the WiMax IEEE 802.16e specification and in the LTE draft specification. Hence, the exemplary embodiments may be implemented in, for example, IEEE 802.16e compatible communication equipment.

The use of the exemplary embodiments beneficially maximizes channel capacity by providing optimal user pairing, while permitting the use of a simple receiver at the destination node. When the pairs of users are determined optimally, MMSE detection performance essentially matches that of ML, with sufficiently many users.

It is shown below how the capacity of the UL of a MU system may be increased by the use of a scheduling strategy that pairs the transmission of users in different TFC slots according to the channel quality. It is further shown how the corresponding combinatorial optimization problem can be solved efficiently by using the Kuhn-Munkres algorithm, also known as the Hungarian method.

Figure 1:
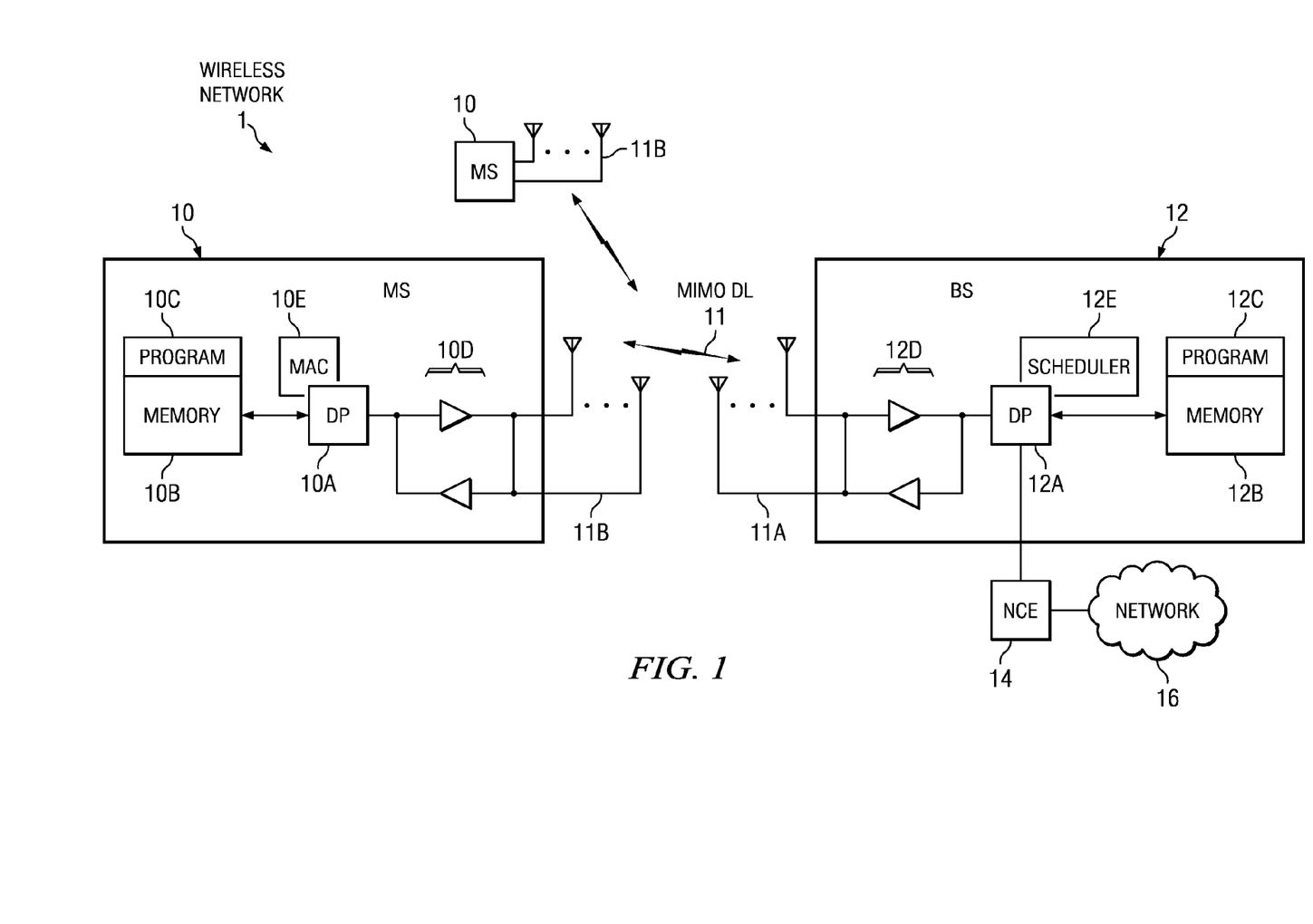
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with users represented as mobile stations (MSs) 10, also referred to as user equipment (UEs) or as user terminals (UTs), via a base station (BS) 12, also referred to as a Node B or, in the E-UTRAN (LTE) system as an evolved Node B (eNB). The wireless network 1 may include a network control element (NCE) 14 or a gateway that may provide connectivity with a network 16, such as the Internet. The MS 10 includes a data processor (DP) 10A, a memory (MEM) 10B that stores a program (PROG) 10C, and a suitable radio frequency (RF) transceiver 10D for bidirectional wireless communications with the BS 12, which also includes a DP 12A, a MEM 12B that stores a PROG 12C, and a suitable RF transceiver 12D.

The BS 12 is assumed to include a MS 10 scheduler unit or function 12E that operates in accordance with the exemplary embodiments of this invention described below. As such, at least the PROG 12C is assumed to include program instructions that, when executed by the associated DP 12A, enable the BS 12 to operate in accordance with the exemplary embodiments of this invention. The exemplary embodiments of this invention may be implemented at least in part by computer software executable by the DP 12A of the BS 12, or by hardware, or by a combination of software and hardware.

In the preferred embodiments the wireless link 11 between the BS 12 and the MSs 10 is a multiuser MIMO link, and there typically are plural transmit (and receive) antennas 11A at the BS 12 and 11B at the MS 10.

In general, the various embodiments of the MS 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

Described now is the optimal pairing of users (MSs 10). An objective function is assumed to be considered for the total instantaneous mutual information between users and the BS 12 when both ML and MMSE receivers are used. It is also shown how the corresponding combinatorial optimization problem can be solved efficiently by using the Hungarian method.

System Model

An exemplary system model is now presented, where the scheduling problem is shown to be a combinatorial optimization problem.

Considering the UL channel, assume that the users are multiplexed in the code domain, i.e., all user's signals overlap both in time and in frequency within a frame. For K users there is $$y = \sum_{k=1}^{K} H^{(k)} x^{(k)} + z, \quad (1)$$

where $x^{(k)} \in \mathbb{C}^{n_t}$ is the transmitted vector from user k, $H^{(k)} \in \mathbb{C}^{n_r \times n_t}$ the channel coefficient matrix, $z \in \mathbb{C}^{n_r}$ the white Gaussian noise vector distributed as $N(0, I_{n_r})$. Let P be the total transmitted power by each user (i.e., $P = E[\|x^{(k)}\|^2]$), and then define SNR=P.

Assume that the transmitter does not have knowledge of the channel (open loop) and the receiver has knowledge of all the channel matrices. Rewriting Eq. (1) in equivalent matrix form gives $$y = [H^{(1)}|\ldots|H^{(K)}]\begin{bmatrix} x^{(1)} \\ \vdots \\ x^{(K)} \end{bmatrix} + z = HX + z \quad (2)$$

where it is assumed that the joint channel $n_r \times Kn_t$ matrix H is constant during the channel use and X is the joint input vector of length $Kn_t$.

Assuming that the receiver performs ML detection the mutual information per user (conditioned by the channel realization) for the channel of Eq. (2) is given by $$I_{ML}(X; y | H) = \frac{1}{K} log_2 \left( \det \left( I_{n_r} + \frac{P}{Kn_t} HH^\dagger \right) \right). \quad (3)$$

Due to the high complexity of ML detection, the simpler MMSE receiver is generally adopted, and in this case we have $$I_{MMSE}(X; y | H) = \frac{1}{K} \sum_{j=1}^{Kn_t} log_2 \left( 1 + h_j^\dagger A_j^{-1} h_j \right), \quad (4)$$

where $h_j$ are the column vectors of H and $$A_j = \frac{Kn_t}{P} I_{n_r} + \sum_{i=1, i \neq j}^{Kn_t} h_i^\dagger h_i.$$

The above expressions represent a measure of the per-user throughput, given that the system is occupying a total bandwidth W. It should be noted, however, that the expressions above are examples that can be used to understand the exemplary embodiments of this invention (e.g., how to define and use performance measures for the optimization task discussed below). In practice, any performance measure can be used that depends on the paired channels. In a practical system this may be an aggregate throughput of a given coding and modulation scheme, or it may be a channel quality indicator (CQI, as used in WiMax/3G/4G systems), as two non-limiting examples of performance measures. In general, the selected measure should reflect the utility of a given pairing. In general, utility measures may also include other parameters, for example service delay, so that a user that has a very high delay compared to a delay target can be prioritized.

The above scheme implies the use of K user MU detection, which can be rather complex for large numbers of users and transmit antennas. For this reason it is common to consider joint TDMA/FDMA/CDMA/SDMA schemes to reduce the number of simultaneous users by allocating them in different TFC slots within a frame. Since the channel matrices for the users are different and determine how the users signals interfere at the receiver, scheduling the users that simultaneously transmit in the same TFC slot can improve the total system throughput.

Pairing Users

First consider the case where K is even and the users are paired to transmit simultaneously in the same TFC slot. The total number of TFC slots (or channel orthogonal resources) is then N=K/2, and it is assumed that the total occupied bandwidth is still W. Fairness is provided by the fact that all users access the channel once within a frame of N TFC slots. Let $H^{(k)}$ denote the channel for user k and assume it is constant over the entire frame.

In this case the received signal in the TFC slot n is $$y(n) = \sum_{(k_1, k_2)}^{(N)} H^{(k_1)} x^{(k_1)} + H^{(k_2)} x^{(k_2)} + z(n) \; n = 1, \ldots, N \quad (5)$$

where the sum runs over N distinct pairs $(k_1, k_2)$ of users, with $k_1 \neq k_2$. Note that the MU detection now handles only two overlapping users per TFC slot and, thus, ML detection may also be viable.

Denote by $\pi$ a particular pairing configuration, within the set of all configurations $\Pi$. The number of ways to choose N disjoint pairs of items from 2N items is ([4]):

$$|\Pi| = (2N-1)!! = (2N-1)(2N-3) \ldots 3 1.$$

For example, with K=4 users there are three configurations:

$$\Pi = \{\{(12)(34)\}\{(13)(24)\}\{(14)(23)\}\}.$$

Selecting the pair that maximizes the above mutual information can thus become a complex task for a small number of users, for example, for K=2, 4, 6, 8, 10, 16 there are a number of configurations $|\Pi|$=1, 3, 15, 105, 945, 2027025

Given Eq. (5), the per user mutual information between X and $Y=(y(1)^T, \ldots, y(N)^T)^T$, given a pairing configuration $\pi$, is $$I_{ML}(X; Y | H, \pi) = \frac{1}{N} \sum_{(k_1, k_2) \in \pi}^{(N)} log_2 \left( \det \left( I_{n_r} + \frac{P}{2n_t} H^{(k_1, k_2)} H^{(k_1, k_2)\dagger} \right) \right) \quad (6)$$

where $H^{(k_1, k_2)} = [H^{(k_1)} | H^{(k_2)}]$. Similarly $$A_j^{(k_1, k_2)} = \frac{2n_t}{P} I_{n_r} + \sum_{i=1, i \neq j}^{2n_t} h_i^{(k_1, k_2)\dagger} h_i^{(k_1, k_2)}.$$

where $h_j^{(k_1, k_2)}$ are the $2n_t$ columns of $H^{(k_1, k_2)}$ and $$I_{MMSE}(X; Y | H, \pi) = \frac{1}{N} \sum_{(k_1, k_2) \in \pi}^{(N)} \sum_{j=1}^{2n_t} log_2 \left( 1 + h_j^{(k_1, k_2)\dagger} A_j^{(k_1, k_2)-1} h_j^{(k_1, k_2)} \right) \quad (7)$$

Both Eqs. (6) and (7) can be written as additive objective functions to be maximized over the choice of $\pi \in \Pi$ $$\max_{\pi \in \Pi} \sum_{(k_1, k_2) \in \pi}^{(N)} f_{k_1, k_2}(\pi). \quad (8)$$

It is shown below how this problem can be solved in polynomial time using the technique known as the Hungarian method.

Both Single Users and Paired Users

Now consider the case where some users are allowed to transmit alone and some other users are paired in the TFC slots. The total number of users is $K=2N_{pair}+N_{sing}$, where $N_{pair}$ is the number of pairs of users that transmit simultaneously in a TFC slot and $N_{sing}$ is the number of users that transmit alone. In this case the total number of TFC slots used in one transmission frame is $N=N_{pair}+N_{sing}$, and the total number of configurations Π is much larger than before, namely:

$$|\Pi| = \sum_{k=1}^{\lfloor K/2 \rfloor} \frac{K!}{(K-2k)!2^k k!}.$$

This number corresponds to the number of partitions of a set of K distinguishable elements into sets of size 1 and 2, or equivalently to the number of K×K symmetric permutation matrices. For example, for K=2, 4, 6, 8, 16 one has |Π|=2, 10, 76, 764, 46206736, and with K=4 users one has the following 10 configurations Π={{(12)(34)},{(13)(24)},{(14)(23)},{(1)(2)(34)},
{(1)(3)(24)},{(1)(4)(23)},{(12)(3)(4)},{(13)(2)
(4)},{(14)(2)(3)},{(1)(2)(3)(4)}}

In this case the optimization problem becomes $$\max_{\pi \in \Pi} \frac{1}{N_{pair}(\pi)} \sum_{(k_1,k_2) \in \pi}^{(N_{pair}(\pi))} f_{k_1,k_2}^{(pair)}(\pi) + \frac{1}{N_{sing}(\pi)} \sum_{(k_3) \in \pi}^{(N_{sing}(\pi))} f_{k_3}^{(sing)}(\pi)$$

One may consider the single users ($k_3$) as being paired with themselves, i.e., ($k_3,k_3$). Unfortunately, this problem is not solvable by the Hungarian method, since the objective function is not a sum of terms only depending on one pair, due to the factors $$\frac{1}{N_{pair}(\pi)} \text{ and } \frac{1}{N_{sing}(\pi)}.$$

This problem is considered more fully below.

Enhanced Scheduling Scheme

In order to have the same total bandwidth for all configurations with different $N_{pair}$ and $N_{sing}$, assume that the $N_{pair}$ paired users access two TFC slots, essentially doubling their rate. As a compensation, the $N_{sing}$ unpaired users are allowed to double their transmit power since this produces comparable out-of-cell interfering power for all TFC slots. Now the total number of TFC slots used in one transmission frame is $N=2N_{pair}+N_{sing}=K$.

It is now shown how a pairing configuration $\pi=\{\pi_{pair}, \pi_{sing}\}$ can be mapped to a permutation σ of K elements of the form $$\sigma: \begin{pmatrix} 1 & 2 & \ldots & K \\ \sigma(1) & \sigma(2) & \ldots & \sigma(K) \end{pmatrix}. \quad (9)$$

Let the pairs $(k_1,k_2) \in \pi_{pair}$ correspond to the two columns of Eq. (9) $(k_1,k_2=\sigma(k_1))^T$ and $(k_2,k_1=\sigma(k_2))^T$, while the unpaired users $(k_3) \in \pi_{sing}$ correspond to the fixed elements of the permutation, i.e., columns of Eq. (9) of the type $(k_3,k_3)^T$. For example $$\pi = \{(1,5)(2,4)(3)\} \Rightarrow \sigma: \begin{pmatrix} 1 & 2 & 3 & 4 & 5 \\ 5 & 4 & 3 & 2 & 1 \end{pmatrix}.$$

Clearly, under the assumptions made above this limits the permutations σ to have at most cycles of length 2. In this enhanced approach one may further expand the possible pairing configurations to include any user permutation σ, i.e., consider K pairs of users (k,σ(k)). For example, one can have $$\pi = \{(1,5)(2,4)(3,3)(4,5)(5,2)\} \Rightarrow \sigma: \begin{pmatrix} 1 & 2 & 3 & 4 & 5 \\ 5 & 4 & 3 & 5 & 2 \end{pmatrix},$$

which is a permutation with a cycle of length 4.

The optimization problem can now be written as $$\max_{\sigma \in S_K} \sum_{(k,\sigma(k))}^{(K)} f_{(k,\sigma(k))} \quad (10)$$

where $S_K$ denotes the group of all permutations (symmetric group).

Solving the Combinatorial Optimization Problem

The above combinatorial optimization problem in Eq. (10) can be solved in polynomial time $O(n^3)$ using a technique known as the Hungarian method, which is commonly used to solve a so-called assignment problem. Reference in this regard can be made to H. W. Kuhn, "The Hungarian Method for the assignment problem," Naval Research Logistic Quarterly, 2:83-97, 1955.

Assignment problem: Given a weighted complete bipartite graph $G=(X \cup Y; X \times Y)$, where edge xy has weight w(xy), find a matching M from X to Y with maximum weight.

In a common application, $X=\{x_1; x_2; \ldots, x_n\}$ may be a set of workers, $Y=\{y_1, y_2, \ldots, y_n\}$ may be a set of jobs, and w(xy) may be the profit made by assigning worker x to job y.

Mathematically, the problem can be stated as follows: given an n×n matrix $$W=[w_{k,l}]=[w(x_k y_l)],$$

find a permutation $\sigma \in S_n$ of n elements for which $$\sum_{k=1}^{n} w(x_k y_{\sigma(k)})$$

is a maximum. This form coincides with Eq. (10) when $w(x_k y_{\sigma(k)})=f_{(k,\sigma(k))}$.

In order to solve the problem in Eq. (8), in the case of even K and where no users are allowed to be unpaired, it is sufficient to initialize the matrix W with zero entries on the diagonal and symmetric entries $w_{k_1,k_2}=w_{k_2,k_1}=f_{(k_1,k_2)}$. The final solution is found by taking only the pairs (k,σ(k)), for k=1, . . . , K/2.

Simulation Results

Figure 2:
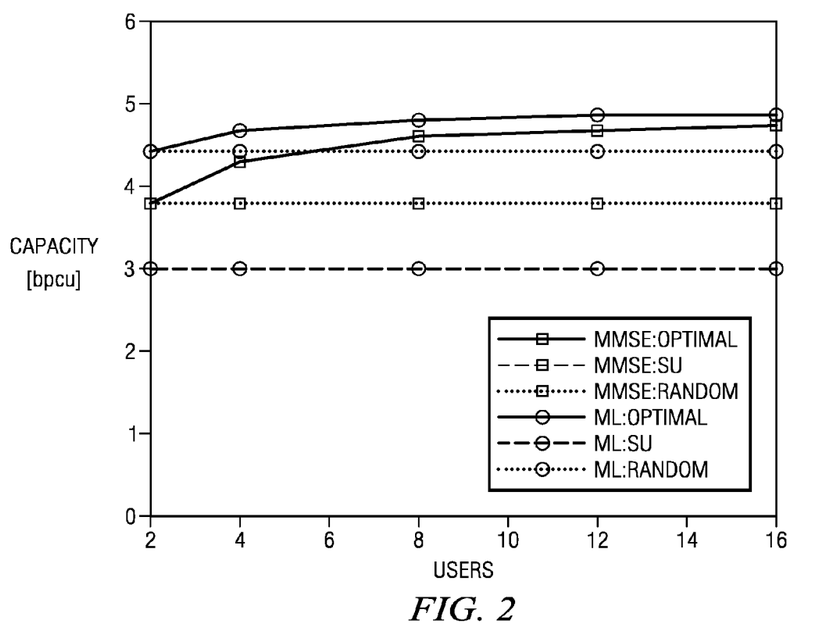
Figure 3:
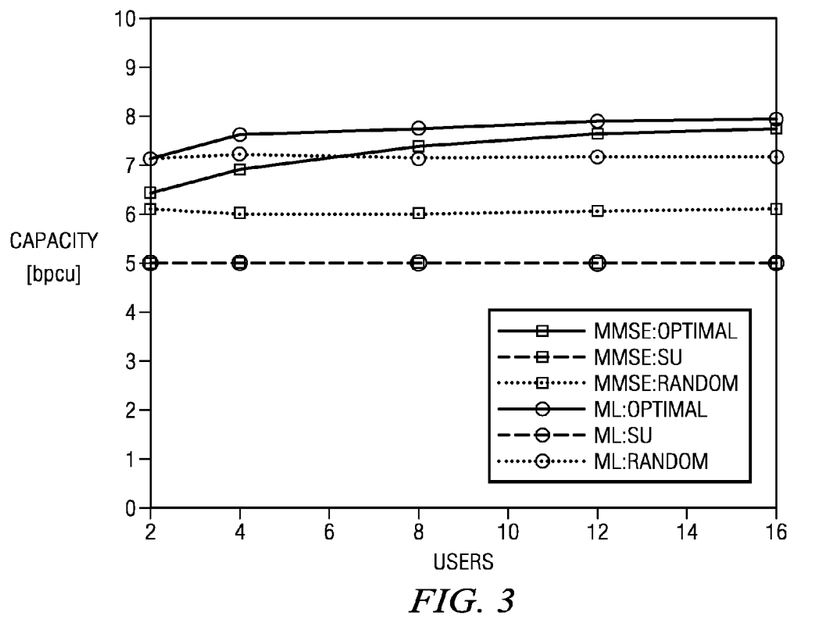

Non-limiting examples of the gains provided by the use of the foregoing exemplary embodiments are now given with reference to FIGS. 2 and 3 (assume $n_t=n_r=2$). FIG. 2 shows capacity expressed in bits per channel use (bpcu) as a function of the number of users, when all the users are paired as for Eq. (8). Both ML and MMSE receivers are compared when the scheduling is optimized, and when it is based on a fixed random assignment. The single user (SU) case is plotted for reference. Similar results are shown in FIG. 3 for the case of Eq. (10), where there are paired users and single users.

The following observations are in order in both cases.

First, there is a substantial capacity gain over the single user case, due at least in part to the spatial multiplexing. Second, the gain of optimal scheduling increases for increasing number of users (for K=2 there is obviously no difference). Third, the gain of the optimal scheduling is larger for the MMSE receiver since the ML receiver can better accommodate ill conditioned situations. And fourth, for large K the MMSE receiver can be seen to approach the ML receiver capacity.

What has been described is a novel signaling scheme based on the optimal scheduling of pairs of users. This particular scheme provides capacity gains using a polynomial time algorithm to compute optimum scheduling. In particular, it provides an improvement in the performance the suboptimal MMSE receiver that enables it to approach, for a large number of users, the performance of the ML receiver.

Referring still to FIGS. 2 and 3, based on the foregoing it should be appreciated that the use of these exemplary embodiments provides a substantial capacity gain as compared to the single user case, due to the beneficial effect of the spatial multiplexing. In addition, the gain achieved by the use of optimal scheduling, as compared to fixed random pairing, increases for increasing number of users.

Based on the foregoing it should be apparent that the exemplary embodiments of this invention provide a method, apparatus and computer program that implement an optimal polynomial-time algorithm for determining a scheduling pattern of K users to TFC slots, where in at least one slot there are simultaneously at least two users present. The scheduling patterns dictate which users are paired to transmit simultaneously (virtual MIMO), and which users are transmitting alone, in a given set of channel resources (TFC slots).

Figure 4:
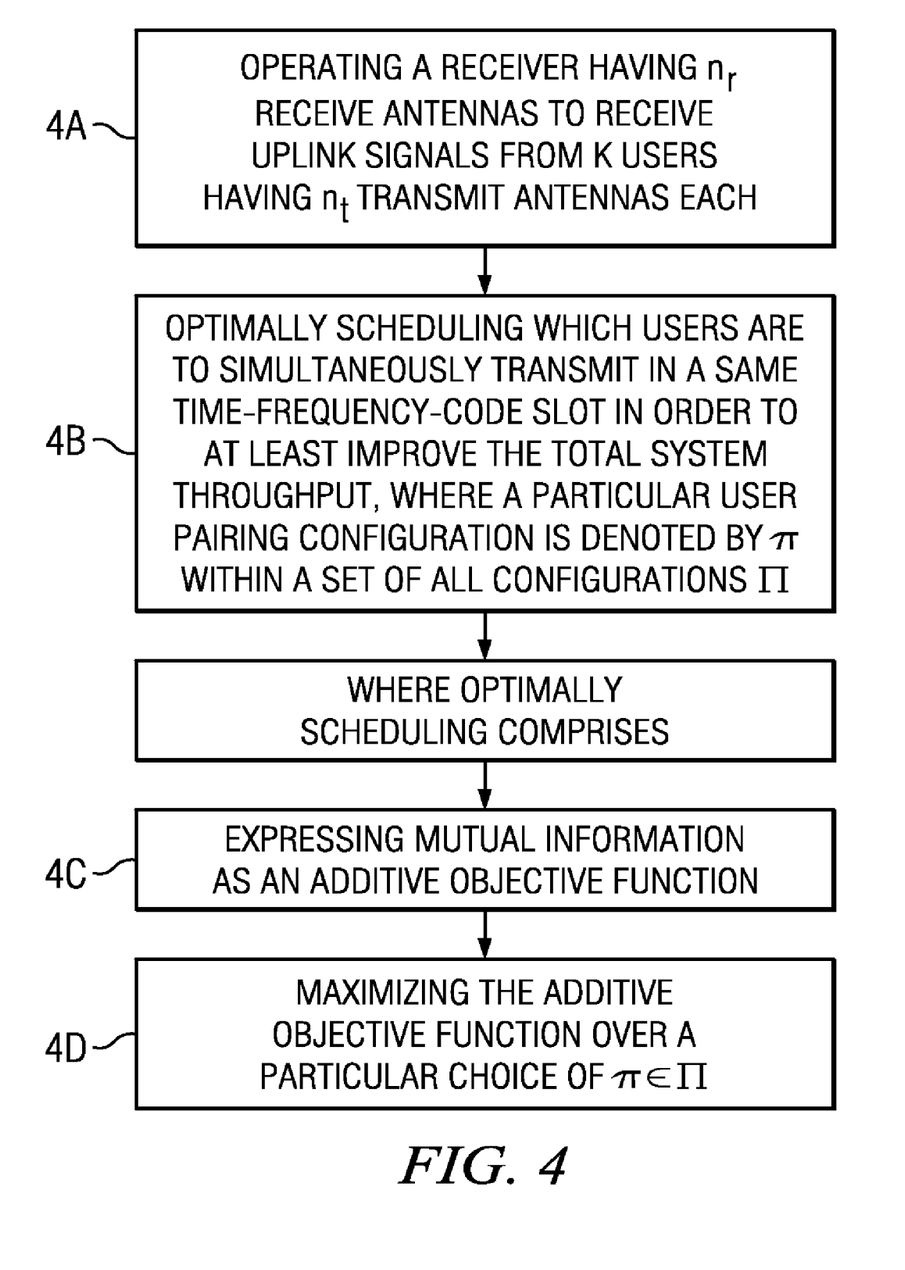
FIG. 4 is a logic flow diagram that is descriptive of a method, and the execution of computer program code, in accordance with the exemplary embodiments of this invention.

Referring to FIG. 4, a method in accordance with this invention includes (Block 4A) operating a receiver having $n_r$ receive antennas to receive uplink signals from K users having $n_t$ transmit antennas each; (Block 4B) optimally scheduling which users are to transmit in a same time-frequency-code slot in order to at least improve the total system throughput, where a particular user pairing configuration is denoted by $\pi$ within a set of all configurations $\Pi$, and where optimally scheduling comprises (Block 4C) expressing mutual information as an additive objective function; and (Block 4D) maximizing the additive objective function over a particular choice of $\pi \in \Pi$.

The method of the preceding paragraph, where the additive objective function that is maximized is expressed as:

$$\max_{\pi \in \Pi} \sum_{(k_1,k_2) \in \pi}^{(N)} f_{k_1,k_2}(\pi),$$

and where maximizing uses a method that comprises, given an n×n matrix $$W=[w_{k,l}]=[w(x_k y^l)],$$

find a permutation $\sigma \in S_n$ of n elements for which $$\sum_{k=1}^{n} w(x_k y_{\sigma(k)})$$

is a maximum.

The method of the preceding paragraph, where for a case of even K, maximizing initialize the matrix W with zero entries on the diagonal and symmetric entries $w_{k_1,k_2}=w_{k_2,k_1}=f_{(k_1,k_2)}$, and obtaining a final solution by taking only the pairs (k,$\sigma$(k)), for k=1, . . . , K/2.

The method of paragraph (A), where there are paired users and unpaired (single) users, where a pairing configuration $\pi=\{\pi_{pair},\pi_{sing}\}$ is mapped to a permutation a of K elements of the form:

$$\pi \Rightarrow \sigma: \begin{pmatrix} 1 & 2 & \ldots & K \\ \sigma(1) & \sigma(2) & \ldots & \sigma(K) \end{pmatrix}.$$

The method of the previous paragraph, where the additive objective function that is maximized is expressed as:

$$\max_{\sigma \in S_K} \sum_{(k,\sigma(k))}^{(K)} f_{(k,\sigma(k))}$$

where $S_K$ denotes the group of all permutations (symmetric group), and where maximizing uses a method that comprises, given an n×n matrix $$W=[w_{k,l}]=[w(x_k y^l)],$$

find a permutation $\sigma \in S_n$ of n elements for which $$\sum_{k=1}^{n} w(x_k y_{\sigma(k)})$$

is a maximum, and by setting, $w(x_k y_{\sigma(k)})=f_{(k,\sigma(k))}$, and where a final solution is found by taking only the pairs (k,$\sigma$(k)), for k=1, . . . , K/2.

The method of the preceding paragraph, where paired users transmit in two TFC slots, and where unpaired users transmit in one TFC slot using twice the power of a paired user.

The various blocks shown in FIG. 4 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WiMAX and EUTRAN (UTRAN-LTE) systems, it should be appreciated that the exemplary embodiments of this invention are not limited for use with only these particular types of wireless communication system, and that they may be used to advantage in other wireless communication systems. Further, the particular mathematic expressions shown and described above are meant to be exemplary, as changes may be made to these expressions, or other expressions used instead. Further, the use of the Hungarian method is not to be construed as limiting as to techniques that may be used to solve the combinatorial optimization problems expressed by Eqs. (8) and (10).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    operating a receiver connected with a plurality of receive antennas to receive uplink signals from a plurality of users each having a plurality of transmit antennas; and
    scheduling which ones of the plurality of users are to transmit in a same time-frequency-code slot, where a particular user pairing configuration is denoted by $\pi$ within a set of all configurations $\Pi$, and where scheduling comprises expressing mutual information as an additive objective function and maximizing the additive objective function over a particular choice of $\pi \in \Pi$,
    wherein the additive objective function that is maximized comprises:

$$\max_{\pi \in \Pi} \sum_{(k_1,k_2) \in \pi}^{(N)} f_{k_1,k_2}(\pi),$$

where f is measure of performance for a pairing of users $k_1$ and $k_2$ and N is an integer total number of distinct pairs of users.

2. The method of claim 1, wherein maximizing comprises using an n×n matrix $W=[w_{k,i}]=[w(x_k y_i)]$ where $w_{k,i}$ is the weight of the $k^{th}$, $i^{th}$ element of the matrix W and $w(x_k, y_i)$ is the weight for a pairing of user $x_k$ and user $y_i$ in the matrix W, and finding a permutation $\sigma \in S_n$, where $S_n$ denotes the group of all permutations of n number of elements, for which $$\sum_{k=1}^{n} w(x_k y_{\sigma(k)})$$

is a maximum, where W is a total bandwidth occupied and xy is an edge.

3. The method of claim 1, wherein there are paired users and unpaired users, wherein a pairing configuration $\pi=\{\pi_{pair}, \pi_{sing}\}$ is mapped to a permutation $\sigma$ of K total number of elements of the form:

$$\pi \Rightarrow \sigma : \begin{pmatrix} 1 & 2 & \dots & K \\ \sigma(1) & \sigma(2) & \dots & \sigma(K) \end{pmatrix},$$

where $\sigma(k)$ is a user paired with user k by the permutation $\sigma$.

4. The method of claim 2, wherein for a case of an even number of users, maximizing the matrix W with zero entries on the diagonal and symmetric entries for $w_{k1,k2}=w_{k2,k1}=f_{(k1,k2)}$, and obtaining a result by taking only the pairs (k,$\sigma$(k)), for k=1, ..., K/2, where K is a total number of pairs of users for a given permutation and $\sigma(k)$ is a user paired with user k by the permutation $\sigma$.

5. The method of claim 3, where the additive objective function that is maximized is expressed as:

$$\max_{\sigma \in S_K} \sum_{(k,\sigma(k))}^{(K)} f_{(k,\sigma(k))}$$

where $S_K$ denotes a group of all permutations and k is an individual user from the K total number of elements.

6. The method of claim 5, where maximizing comprises, given an n×n matrix $W=[w_{k,i}]=[w(x_k y_i)]$, where $W_{k,i}$ is a weight of the $k^{th}$, $i^{th}$ element of the matrix W and $w(x_k, y_i)$ is a weight for a pairing of user $x_k$ and user $y_i$ in the matrix W, finding a permutation $\sigma \in S_n$, where $S_n$ denotes the group of all permutations of n number of elements, for which $$\sum_{k=1}^{n} w(x_k y_{\sigma(k)})$$

is a maximum, and by setting $w(x_k y_{\sigma(k)}) = f_{(k,\sigma(k))}$, and where a result is found by taking only the pairs $(k,\sigma(k))$, for $k=1, \ldots, K/2$, where W is a total bandwidth occupied and xy is an edge.

7. An apparatus, comprising:
   at least one processor;
   at least one memory including computer program code;
   the at least one memory and the computer program code configured to, with the at least one processor, cause the apparatus at least to:
   operate a receiver connected with a plurality of receive antennas to receive uplink signals from a plurality of users each having a plurality of transmit antennas; and
   schedule which ones of the plurality of users are to transmit in a same time-frequency-code slot, where a particular user pairing configuration is denoted by $\pi$ within a set of all configurations $\Pi$, and where scheduling comprises expressing mutual information as an additive objective function and maximizing the additive objective function over a particular choice of $\pi \in \Pi$,
   wherein the additive objective function that is maximized comprises:

$$\max_{\pi \in \Pi} \sum_{(k_1,k_2) \in \pi}^{(N)} f_{k_1,k_2}(\pi),$$

where f is measure of performance for a pairing of users $k_1$ and $k_2$ and N is an integer total number of distinct pairs of users.

8. The apparatus of claim 7, wherein maximizing comprises using an n×n matrix $W=[w_{k,l}]=[w(x_k y_l)]$, where $w_{k,l}$ is the weight of the $k^{th}$, $l^{th}$ element of the matrix W and $w(x_k, y_l)$ is the weight for a pairing of user $x_k$ and user $y_l$ in the matrix W, and finding a permutation $\sigma \in S_n$, where $S_n$ denotes the group of all permutations of n number of elements, for which $$\sum_{k=1}^{n} w(x_k y_{\sigma(k)})$$

is a maximum, where W is a total bandwidth occupied and xy is an edge.

9. The apparatus of claim 7, wherein there are paired users and unpaired users, wherein a pairing configuration $\pi = \{\pi_{pair}, \pi_{sing}\}$ is mapped to a permutation $\sigma$ of K total number of elements of the form:

$$\pi \Rightarrow \sigma : \begin{pmatrix} 1 & 2 & \ldots & K \\ \sigma(1) & \sigma(2) & \ldots & \sigma(K) \end{pmatrix},$$

where $\sigma(k)$ is a user paired with user k by the permutation $\sigma$.

10. The apparatus of claim 7, wherein the apparatus is embodied as at least one integrated circuit.

11. The apparatus of claim 8, wherein for a case of an even number of users, maximizing the matrix W with zero entries on the diagonal and symmetric entries for $w_{k_1,k_2} = w_{k_2,k_1} = f_{(k_1,k_1)}$, and obtaining a result by taking only the pairs $(k,\sigma(k))$, for $k=1, \ldots, K/2$, where K is a total number of pairs of users for a given permutation and $\sigma(k)$ is a user paired with user k by the permutation $\sigma$.

12. The apparatus of claim 9, where the additive objective function that is maximized is expressed as:

$$\max_{\sigma \in S_K} \sum_{(k,\sigma(k))}^{(K)} f_{(k,\sigma(k))}$$

where $S_K$ denotes a group of all permutations and k is an individual user from the total number of users K, and where maximizing comprises, given an n×n matrix $W=[w_{k,l}]=[w(x_k y_l)]$, where $w_{k,l}$ is the weight of the $k^{th}$, $l^{th}$ element of the matrix W and $w(x_k, y_l)$ is the weight for a pairing of user $x_k$ and user $y_l$ in the matrix W, finding a permutation $\sigma \in S_n$, where $S_n$ denotes the group of all permutations of n number of elements, for which $$\sum_{k=1}^{n} w(x_k y_{\sigma(k)})$$

is a maximum, and by setting $w(x_k y_{\sigma(k)}) = f_{k,\sigma(k)}$, and where a result is found by taking only the pairs $(k,\sigma(k))$, for $k=1, \ldots, K/2$, where W is a total bandwidth occupied and xy is an edge.

13. A non-transitory computer-readable storage medium tangibly embodying computer program code configured to, with at least one processor, perform operations, the operations comprising:
   operating a receiver connected with a plurality of receive antennas to receive uplink signals from a plurality of users each having a plurality of transmit antennas; and
   scheduling which ones of the plurality of users are to transmit in a same time-frequency-code slot, where a particular user pairing configuration is denoted by $\pi$ within a set of all configurations $\Pi$, and where scheduling comprises expressing mutual information as an additive objective function and maximizing the additive objective function over a particular choice of $\pi \in \Pi$,
   wherein the additive objective function that is maximized comprises:

$$\max_{\pi \in \Pi} \sum_{(k_1,k_2) \in \pi}^{(N)} f_{k_1,k_2}(\pi),$$

where f is measure of performance for a pairing of users $k_1$ and $k_2$ and N is an integer total number of distinct pairs of users.

14. The non-transitory computer-readable storage medium of claim 13, wherein maximizing comprises using an n×n matrix $W=[w_{k,l}]=[w(x_k y_l)]$, where $w_{k,l}$ is the weight of the $k^{th}$, $l^{th}$ element of the matrix W and $w(x_k, y_l)$ is the weight for a pairing of user $x_k$ and user $y_l$ in the matrix W, and finding a permutation σ∈$S_n$, where $S_n$ denotes the group of all permutations of n number of elements, for which $$\sum_{k=1}^{n} w(x_k y_{\sigma(k)})$$

is a maximum, where W is a total bandwidth occupied and xy is an edge.

15. The non-transitory computer-readable storage medium of claim 13, wherein there are paired users and unpaired users, wherein a pairing configuration $\pi = \{\pi_{pair}, \pi_{sing}\}$ is mapped to a permutation σ of K total number of elements of the form:

$$\pi \Rightarrow \sigma : \begin{pmatrix} 1 & 2 & \ldots & K \\ \sigma(1) & \sigma(2) & \ldots & \sigma(K) \end{pmatrix},$$

where σ(k) is a user paired with user k by the permutation σ.

16. The non-transitory computer-readable storage medium of claim 14, wherein for a case of an even number of users, maximizing the matrix W with zero entries on the diagonal and symmetric entries for $w_{k_1,k_2} = w_{k_2,k_1} = f_{(k_1,k_1)}$, and obtaining a result by taking only the pairs (k,σ(k)), for k=1, . . . , K/2, where K is a total number of pairs of users for a given permutation and σ(k) is a user paired with user k by the permutation σ.

17. The non-transitory computer-readable storage medium of claim 15, where the additive objective function that is maximized is expressed as:

$$\max_{\sigma \in S_K} \sum_{(k,\sigma(k))}^{(K)} f_{(k,\sigma(k))}$$

where $S_K$ denotes a group of all permutations and k is an individual user from the total number of users K, and where maximizing comprises, given an n×n matrix $W=[w_{k,\ell}]=[w(x_k y_\ell)]$, where $w_{k,\ell}$ is the weight of the $k^{th}, \ell^{th}$ element of the matrix W and $w(x_k, y_\ell)$ is the weight for a pairing of user $x_k$ and user $y_\ell$ in the matrix W, finding a permutation σ∈$S_n$, where $S_n$ denotes the group of all permutations of n number of elements, for which $$\sum_{k=1}^{n} w(x_k y_{\sigma(k)})$$

is a maximum, and by setting $w(x_k y_{\sigma(k)}) = f_{(k,\sigma(k))}$, and where a result is found by taking only the pairs (k,σ(k)), for k=1, . . . , K/2, where W is a total bandwidth occupied and xy is an edge.

* * * * *